United States Patent
Phillips

(10) Patent No.: US 6,945,352 B2
(45) Date of Patent: Sep. 20, 2005

(54) FORCE-BASED POWER STEERING SYSTEM

(75) Inventor: Edward H. Phillips, Troy, MI (US)

(73) Assignee: Techo Corporation, Southfield, MI (US)

(*) Notice: Subject to any disclaimer, the term of this patent is extended or adjusted under 35 U.S.C. 154(b) by 0 days.

(21) Appl. No.: 10/858,093

(22) Filed: Jun. 1, 2004

(65) Prior Publication Data

US 2004/0238260 A1 Dec. 2, 2004

Related U.S. Application Data

(60) Provisional application No. 60/474,093, filed on May 29, 2003.

(51) Int. Cl.[7] .................................................. B62D 5/04
(52) U.S. Cl. ........................................ 180/422; 701/42
(58) Field of Search ................................ 180/422, 417; 701/41, 42; 137/596.17, 625.25, 596.2

(56) References Cited

U.S. PATENT DOCUMENTS

| 5,224,564 | A | * | 7/1993 | Duffy | 180/422 |
|---|---|---|---|---|---|
| 5,307,892 | A | * | 5/1994 | Phillips | 180/422 |
| RE34,746 | E | * | 10/1994 | Schutten et al. | 60/384 |
| 5,725,023 | A | * | 3/1998 | Padula | 137/596.17 |
| 5,931,256 | A | * | 8/1999 | Langkamp | 180/422 |
| 5,936,379 | A | * | 8/1999 | Matsuoka | 318/810 |
| 5,953,978 | A | * | 9/1999 | Bohner et al. | 91/363 A |
| 6,152,254 | A | * | 11/2000 | Phillips | 180/422 |
| 6,250,416 | B1 | * | 6/2001 | Pluschke et al. | 180/404 |

* cited by examiner

Primary Examiner—Tony Winner
(74) Attorney, Agent, or Firm—Gifford, Krass, Groh, Sprinkle, Anderson & Citkowski, PC

(57) ABSTRACT

Apparatus and method is presented for enabling a power steering system comprising an accumulator, a reservoir, and an electronically controlled closed-center control valve assembly for selectively fluidly coupling the accumulator and reservoir to a double-acting power cylinder of a power steering system to function in the manner of a force-based power steering system.

3 Claims, 4 Drawing Sheets

FORCE-BASED POWER STEERING SYSTEM

RELATED APPLICATION

This application claims priority of U.S. Provisional Patent Application Ser. No. 60/474,093 filed May 29, 2003.

BACKGROUND OF THE INVENTION

The present invention relates generally to power steering systems for vehicles, and more particularly to an electrically powered steering system intended for large vehicles.

Virtually all present power steering systems comprise implementation means whose fundamental output is force based. By way of example, present art power steering systems generally comprise a common open-center valve that delivers differential pressure to a double-acting power cylinder as a function of torque applied to a steering wheel. This is accomplished via the steering wheel progressively closing off return orifices comprised within the open-center valve. Another example is an electric power steering system (hereinafter "EPS system") wherein a servo-motor delivers torque as a function of current applied to it by a controller. An EPS system of particular interest herein is described in U.S. Pat. No. 6,152,254, entitled "Feedback and Servo Control for Electric Power Steering System with Hydraulic Transmission", issued Nov. 28, 2000 to Edward H. Phillips, wherein differential pressure is directly delivered to a double-acting power cylinder from a servo-motor driven reversible fluid pump. Because of continued reference below to the '254 patent, the whole of that patent is expressly incorporated by reference herein.

While the EPS system described in the incorporated '254 patent has optimum performance characteristics, it like all EPS systems is limited in utilization to relatively small vehicles because of limited available electrical power. All vehicle manufacturers limit electrical current availability for EPS systems to a value that can be supplied directly from an alternator. A limiting value of perhaps 70 Amperes from a 12 Volt electrical system is typical. At a lower limiting voltage value of 10 Volts and an overall EPS system efficiency of perhaps 60% this results in a net maximum power delivery from the steering gear of only 420 Watts. This low value stands in stark contrast to known future power steering system requirements ranging as high as 3,500 Watts.

Various so-called "closed-center" power steering systems have been proposed as a solution to this problem. Such closed-center power steering systems utilize an accumulator to store power steering fluid at relatively high pressure. Some form of closed-center valving is then used to meter a flow of pressurized fluid to one end of a double-acting power cylinder while concomitantly permitting a similar return flow of low pressure fluid from the other end to a reservoir. Pressurized fluid is supplied to the accumulator from the reservoir by a relatively small displacement pump driven by a simple (e.g., non-servo) motor controlled by a pressure activated switch.

To date however, none of the proposed closed-center power steering systems has provided acceptable on-center steering "feel" and they have not gained acceptance in the industry. It is believed herein that the primary problem with the closed-center power steering systems proposed to date is that their fundamental output is fluid flow or rate-based rather than force-based as is described above with reference to currently accepted power steering systems. The rate-based closed-center systems provide nominally linear control of system velocity with inherent discontinuities in system acceleration while the force-based systems directly provide linear control of system acceleration. It is believed herein that these discontinuities in system acceleration are the root cause of the unacceptable on-center steering feel in the closed-center power steering systems.

Therefore, it would be highly advantageous to provide an accumulator and closed-center valve enabled power steering system that has the acceptable on-center steering "feel" provided by a force-based power steering system.

SUMMARY OF THE INVENTION

This and other objects are achieved in a power steering system according to the present invention, in which method and apparatus are presented for enabling an accumulator and closed-center valve enabled power steering system to function in the manner of a force-based power steering system for a host vehicle.

The implementing apparatus utilized in the power steering system of the present invention comprises: a steering wheel; a power steering gear comprising a double-acting power cylinder having first and second cylinder ports; an accumulator; a reservoir; an electronically controlled closed-center control valve assembly having an input pressure port fluidly connected to the accumulator, a return port fluidly connected to a reservoir, and first and second output ports respectively connected to first and second ports of the double-acting power cylinder; a steering wheel torque transducer for providing a steering wheel torque signal indicative of torque applied to the steering wheel; first and second pressure transducers for providing first and second pressure signals indicative of pressure values respectively present at the first and second ports of the power cylinder; and a controller, wherein the controller provides a control signal to the electronically controlled closed-center control valve assembly for controlling it such that selected instant pressure values are supplied to the instant higher pressure one of the first and second ports of the power cylinder in response to at least the steering wheel torque signal.

The accumulator is initially and then intermittently charged with fluid such that the accumulator fluid pressure is always greater than a selected threshold value exceeding that required for executing any likely steering load. Operationally, whenever torque is applied to the steering wheel, an applied torque signal is sent to the controller by the torque transducer. The applied torque signal is then multiplied by a control function constant $K_{cf}$ that is generated by the controller as a function of the applied torque value and vehicle speed in accordance with procedures fully explained in the incorporated '254 patent. The applied torque signal is next multiplied by the control function constant $K_{cf}$ to form a control function signal. The pressure signal from the pressure transducer having the greater value is then subtracted from the control function signal whereby the resulting algebraic sum forms an error signal. The error signal is then filtered and amplified to form a control signal that is then used to control the electronically controlled closed-center control valve assembly in such a manner as to cause the error signal to decrease in value.

It is desirable for working pressures in the power cylinder to always be kept at the lowest pressure values possible. Thus pressure values applied to various power cylinder seals are kept to a minimum thereby reducing leakage problems and minimizing Coulomb friction. Thus preferably, the present invention also comprises a two-position three-way valve for fluidly coupling the cylinder port having the lowest pressure value to the reservoir. The two-position three-way valve is configured and functions in exactly the same manner as three-way valve (39) of the incorporated '254 patent. However, as a consequence of fluidly coupling the cylinder port having the lowest pressure value to the reservoir it is then necessary for the electronically controlled closed-center control valve assembly to separately supply fluid to the first and second cylinder ports in order to preclude the possibility of accumulator-sourced fluid directly flowing to the reservoir via the two-position three-way valve.

For that reason, the electronically controlled closed-center control valve assembly of the present invention preferably comprises first and second electronically controlled three-way control valves wherein each has an input pressure port fluidly connected to the accumulator, a return port fluidly connected to the reservoir, and a single output port fluidly connected to respective ones of the first and second power cylinder ports. Also preferably, each three-way control valve also comprises a feedback spring whereby the electronically controlled three-way control valves are biased in the direction of fluidly coupling their output ports to their return ports, and therefore, their respective portions of the double-acting power cylinder to the reservoir.

In addition, it is also desirable to fluidly couple both of the left and right cylinder ports to the reservoir during "on-center" steering conditions whereat nominal zero valued desired power cylinder differential pressure values are required anyway. This improves overall system efficiency by allowing small on-center steering motions to be effected without using any accumulator-sourced fluid. An electronically controlled, spring-loaded, compound two-way valve is provided for this purpose. The spring-loaded feature serves along with the biasing feedback spring feature described above (e.g., with respect to the electronically controlled three-way control valves) as a fail-safe mechanism whereby the left and right cylinder ports are fluidly connected to the reservoir in the event of any system failure. The compound two-way valve is of course progressively closed as steering wheel torque is increased (e.g., in either direction) in order to permit differential pressure to be applied to the power cylinder.

In order to achieve overall system stability, it is desirable to control the control valve within an inner feedback control loop separate from the overall feedback loop implemented with reference to the torque transducer. This is enabled via the inner feedback control loop being implemented with reference to the pressure signals representative of actual fluid pressure values present at the first and second cylinder ports as provided by the respective first and second pressure transducers. This type of control technique is described in detail in the incorporated '254 patent.

In its fundamental form the method for enabling a power steering system comprising an accumulator, a reservoir, and an electronically controlled closed-center control valve assembly for selectively fluidly coupling the accumulator and/or reservoir to the ports of a double-acting power cylinder, to function in the manner of a force-based power steering system comprises the steps of: measuring values of torque applied to the steering wheel of a host vehicle; determining desired instant differential pressure values to be applied between first and second ports of the power cylinder in response to a selected function of the instant applied torque values, vehicle speed and any other desired system input factors; measuring the actual instant differential pressure values actually present between the first and second ports of the power cylinder; subtracting actual instant differential pressure values from the desired instant differential pressure values to form an error signal; filtering and amplifying the error signal to form a control signal; and operating the electronically controlled closed-center control valve assembly in response to the control signal so as to continually reduce the error signal and thus provide the desired instant differential pressure values between the first and second ports of the power cylinder.

In particular wherein the electronically controlled closed-center control valve assembly comprises a two-position three-way valve for fluidly coupling the cylinder port having the lowest pressure value to the reservoir and the preferred pair of first and second electronically controlled three-way control valves, the method comprises the steps of: measuring values of torque applied to the steering wheel of the host vehicle; determining polarity of and measuring the actual instant differential pressure values actually present between the first and second ports of the power cylinder; determining desired polarity and instant differential pressure values to be applied between first and second ports of the power cylinder in response to a selected function of the instant applied torque values, vehicle speed and any other desired system input factors; subtracting actual instant differential pressure values from the desired instant differential pressure values to form an error signal; filtering and amplifying the error signal to form a control signal; selecting an appropriate one of the first and second electronically controlled three-way closed-center control valves in accordance with the polarity of the actual instant differential pressure value between the first and second ports of the power cylinder; and operating the selected electronically controlled three-way closed-center control valve in response to the control signal so as to continually reduce the error signal and thus provide the desired instant differential pressure value between the first and second ports of the power cylinder.

In a first aspect, then, the present invention is directed to apparatus for enabling an accumulator and closed-center valve enabled power steering system to function in the manner of a force-based power steering system for a host vehicle, wherein the apparatus comprises: a steering wheel; a power steering gear comprising a double-acting power cylinder having first and second cylinder ports; an accumulator; a reservoir; an electronically controlled closed-center control valve assembly having an input pressure port fluidly connected to the accumulator, a return port fluidly connected to a reservoir, and first and second output ports respectively fluidly connected to first and second ports of the double-acting power cylinder; a steering wheel torque transducer for providing a steering wheel torque signal indicative of torque applied to the steering wheel; first and second pressure transducers for providing first and second pressure signals indicative of pressure values respectively present at the first and second ports of the power cylinder; and a controller, wherein the controller provides a control signal to the electronically controlled closed-center control valve assembly for controlling it such that selected instant pressure values are supplied to the instant higher pressure one of the first and second ports of the power cylinder in response to at least the steering wheel torque signal.

In a second aspect, the present invention is directed to the apparatus of the first aspect, wherein the apparatus additionally comprises first and second pressure transducers fluidly coupled to the first and second ports of the double-acting power cylinder, respectively, and wherein the first and second pressure transducers respectively issue pressure signals indicative of fluid pressure values instantly present at the first and second ports of the double-acting power cylinder to the controller.

In a third aspect, the present invention is directed to the apparatus of the second aspect, wherein the electronically controlled closed-center control valve assembly comprises first and second electronically controlled three-way control valves, each having an input pressure port fluidly connected to the accumulator, a return port fluidly connected to the reservoir and an output port fluidly connected to a respective power cylinder port, and further wherein the controller selects the one of the electronically controlled three-way control valves fluidly connected to the one of the first and second pressure transducers issuing the higher valued pressure signal, and operates the selected electronically controlled three-way control valve in response to at least the magnitude of the steering wheel torque signal.

In a fourth aspect, the present invention is directed to a method for enabling a power steering system utilizing an accumulator, a reservoir, and an electronically controlled closed-center control valve assembly for selectively fluidly coupling the accumulator and reservoir to a double-acting power cylinder of a power steering system, to function in the manner of a force-based power steering system, wherein the method comprises the steps of: measuring values of torque applied to the steering wheel of a host vehicle; determining desired instant differential pressure values to be applied between first and second ports of the power cylinder in response to a selected function of the instant applied torque values, vehicle speed and any other desired system input factors; measuring instant differential pressure values actually present between the first and second ports of the power cylinder; subtracting actual instant differential pressure values from the desired instant differential pressure values to form an error signal; amplifying the error signal to form a control signal; and operating the electronically controlled closed-center control valve assembly in response to the control signal so as to continually reduce the error signal and thus provide the desired instant differential pressure values between the first and second ports of the power cylinder.

In a fifth aspect, the present invention is directed to a method for enabling a power steering system utilizing an accumulator, a reservoir, a two-position three-way valve for fluidly coupling the cylinder port having the lowest pressure value to the reservoir, and first and second electronically controlled three-way closed-center control valves, to function in the manner of a force-based power steering system, wherein the method comprises the steps of: measuring values of torque applied to the steering wheel of a host vehicle; determining polarity of and measuring instant differential pressure values actually present between the first and second ports of the power cylinder; determining desired polarity and instant differential pressure values to be applied between first and second ports of the power cylinder in response to a selected function of the instant applied torque value, vehicle speed and any other desired system input factors; subtracting instant differential pressure values from the desired instant differential pressure values to form an error signal; amplifying the error signal to form a control signal; selecting an appropriate one of the first and second electronically controlled three-way closed-center control valves in accordance with the polarity of the actual instant differential pressure value between the first and second ports of the power cylinder; and operating the selected electronically controlled three-way closed-center control valve in response to the control signal so as to continually reduce the error signal and thus provide the desired instant differential pressure values between the first and second ports of the power cylinder.

Because of its improved steering feel and ability to service known future power steering systems whose net hydraulic power requirements range as high as 3,500 Watts, a power steering system configured according to the present invention possesses distinct advantages over known prior art power steering systems able to handle such large steering loads. For example, the power steering system of the present invention provides dramatically improved system efficiency when compared to standard hydraulic power steering systems utilizing engine driven pumps. Further, the power steering system of the present invention provides dramatically improved tactile feel when compared to known prior art accumulator and closed-center valve enabled power steering systems. Thus, the power steering systems of the present invention enable both efficient and tactilely acceptable power steering for large vehicles.

BRIEF DESCRIPTION OF THE DRAWING

A better understanding of the present invention will now be had with reference to the accompanying drawing, wherein like reference characters refer to like parts throughout the several views herein, and in which.

DETAILED DESCRIPTION OF THE PREFERRED EMBODIMENT

Figure 1:
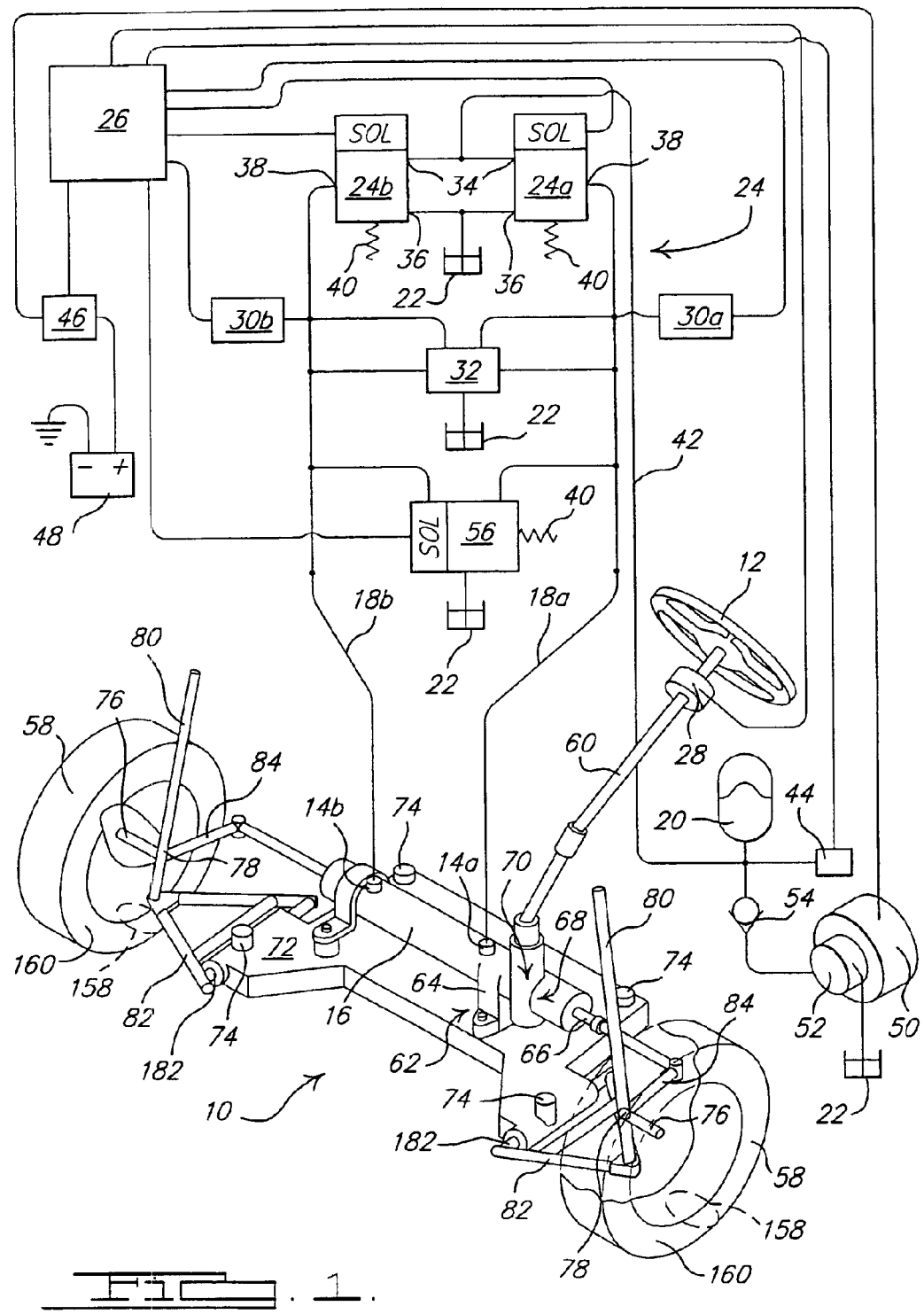
FIG. 1 is a combined perspective and schematic view of a portion of a host vehicle which includes in it the power steering system of the present invention.

The present invention is directed to method and apparatus for enabling an accumulator and closed-center valve enabled power steering system to function in the manner of a force-based power steering system. With reference first to FIG. 1, there shown is a schematic view depicting operative elements of a power steering system 10 wherein torque applied by a driver to a steering wheel 12 results in differential pressure being applied to first and second ports 14a and 14b of a double-acting power cylinder 16 via first and second fluid lines 18a and 18b, respectively. Controlled amounts of pressurized fluid issuing from an accumulator 20 or returning to a reservoir 22 are metered to or from first and second fluid lines 18a and 18b via an electronically controlled closed-center control valve assembly 24 in response to control signals issuing from a controller 26.

The accumulator 20 is initially and then intermittently charged with fluid such that the accumulator fluid pressure is greater than a selected threshold value exceeding that required for meeting any likely steering load. Operationally, whenever torque is applied to the steering wheel 12, an applied torque signal is sent to the controller 26 by a torque transducer 28. As will be further described below, the applied torque signal is next multiplied by the control function constant $K_{cf}$ to form a control function signal where the control function constant $K_{cf}$ is generated by the controller 26 as a function of the applied torque value and vehicle speed in accordance with procedures fully explained in the incorporated '254 patent. The pressure signal from the pressure transducer 30a or 30b having the greater value is then subtracted from the control function signal whereby the resulting algebraic sum forms an error signal. The error signal is then filtered and amplified to form a control signal that is in turn applied to the electronically controlled closed-center control valve assembly 24 in such a manner as to cause the error signal to decrease in value.

It is desirable for working pressures in the power cylinder 16 to always be kept at the lowest pressure values possible. This keeps pressure values applied to various power cylinder seals to a minimum thereby reducing leakage problems and minimizing Coulomb friction. Thus preferably, the present invention also comprises a two-position three-way valve 32 for fluidly coupling the cylinder port 14a or 14b having the lowest pressure value to the reservoir 22. The two-position three-way valve 32 is configured and functions in exactly the same manner a three-way valve (39) of the incorporated '254 patent. However, as a consequence of fluidly coupling the cylinder port 14a or 14b having the lowest pressure value to the reservoir 22 it is then necessary for the electronically controlled closed-center control valve assembly 24 to separately supply fluid to the first and second cylinder ports 14a and 14b in order to preclude the possibility of fluid issuing from the accumulator 20 directly flowing to the reservoir 22 via the two-position three-way valve 32.

For that reason, the electronically controlled closed-center control valve assembly 24 of the present invention preferably comprises first and second electronically controlled three-way control valves 24a and 24b wherein each has an input pressure port 34 fluidly connected to the accumulator 20, a return port 36 fluidly connected to the reservoir 22, and a single output port 38 fluidly connected to a respective one of the first and second power cylinder ports 14a and 14b. Also preferably, each three-way control valve 24a or 24b comprises a feedback spring 40 whereby the electronically controlled three-way control valves 24a and 24b are biased in the direction of fluidly coupling their output ports 38 to their return ports 36, and therefore, their respective portions of the power cylinder 16 to the reservoir 22.

Instant supply pressure values present in a supply line 42 connecting the accumulator 20 to the control valves 24a and 24b are monitored by a pressure transducer 44 and conveyed to the controller 26. Whenever either the supply pressure value or its time based derivative drop below predetermined activation threshold levels, the controller 26 issues an activation signal to a contactor 46 whereby a battery 48 is operatively connected to a motor 50 whereby the motor 50 drives a pump 52 that then pumps fluid from the reservoir 22 to the accumulator 20 via a check valve 54 and the supply line 42. This continues until a predetermined maximum supply pressure value is reached whereat the contactor 46 opens and the pump 52 stops. The check valve 54 is utilized in preventing back flow to the reservoir 22 via leakage through the pump 52 whenever it is stopped.

If desired, the motor 50 may be a variable speed motor driven by a control signal issuing from the controller 26 such that the motor 50 and pump 52 function as part of a relatively simple servo system for substantially maintaining supply pressure at a preselected nominal value. This may be desirable for maintaining consistent control valve characteristics for the electronically controlled three-way control valves 24a and 24b. Alternately, although it probably would not incorporate the time derivative function, a simple pressure activated switch having suitable hysteresis (not shown) could of course also be utilized for this purpose.

It is also desirable to fluidly couple both of the left and right cylinder ports 14a and 14b to the reservoir 22 during "on-center" steering conditions whereat nominal zero values desired power cylinder differential pressure values are required anyway. This improves overall system efficiency by allowing small on-center steering motions to be effected without using any accumulator-sourced fluid. An electronically controlled compound two-way valve 56 similarly spring-loaded in the open direction by another feedback spring 40 is provided for this purpose. The spring-loading the compound two-way valve 56 and the three-way control valves 24a and 24b in this manner serves as a fail-safe mechanism whereby the left and right cylinder ports 14a and 14b are fluidly connected to the reservoir 22 in the event of any system failure. The compound two-way valve 56 is of course progressively closed as applied steering wheel torque is increased (in either direction) in order to permit differential pressure to be applied to the power cylinder 16.

With continued reference to FIG. 1, the power steering system 10 is there shown in perspective in conjunction with various constituents of a host vehicle in which the power steering system 10 is located. More particularly, the steering wheel 12 is rotated by a driver as he or she steers the dirigible (steerable) wheels 58 of the vehicle. The steering wheel 12 is connected to the dirigible wheels 58 by a steering shaft 60 coupled to a suitable steering gear 62, for example, of the rack-and-pinion type, contained in a steering gear housing 64 and engaged with a rack 66 by a pinion (not shown). In addition, as viewed from the steering shaft 60, the steering gear comprises a torsionally compliant member (also not shown). This torsionally compliant member is usually a torsion bar. For convenience, the pinion and the torsion bar will hereinafter be referred to as "the pinion 68" and "the torsion bar 70", respectively.

As is conventional, application of an applied steering torque $T_s$ to the steering wheel 12 results in application of an assisted steering force to the dirigible wheels 58. More particularly, the rack 66 is partly contained within a portion of the steering gear housing 64 comprising the power cylinder 16. The steering gear housing 64 is in turn fixed to a conventional steering assembly sub-frame 72. The steering assembly sub-frame 72 includes a plurality of mounts 74 for connecting the steering assembly sub-frame 72 to the vehicle chassis (not shown). The dirigible wheels 58 are rotatably carried on wheel spindles 76 connected to vehicle steering knuckles 78 and vehicle struts 80. The steering knuckles 78 are pivotably connected to the steering assembly sub-frame 72 by lower control arms 82. A portion 84 of each steering knuckle 78 defines a knuckle arm radius about which the assisted steering force, comprising both mechanically derived steering force and powered assist to steering as respectively provided by a pinion-rack interface (not shown) and the power cylinder 16, is applied.

Figure 2:
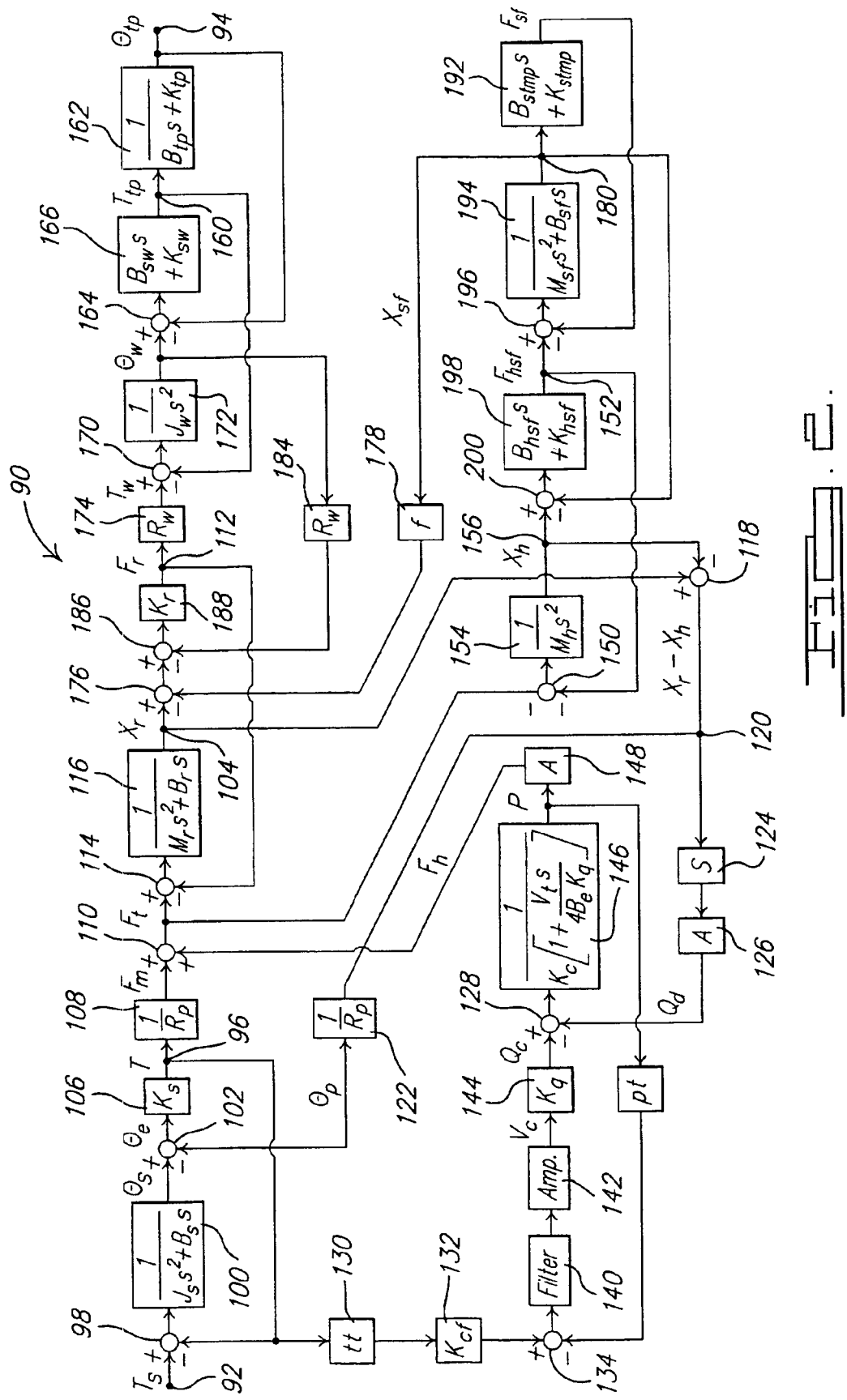
FIG. 2 is a block diagram representing various mechanical, hydraulic and electronic connections and relationships existing in the host vehicle which includes in it the power steering system of the present invention.

With reference now to FIG. 2, there shown is a block diagram 90 that is helpful in understanding various mechanical and hydraulic connections and relationships existing in a host vehicle. These connections control the dynamic linkage between steering wheel torque $T_s$ applied by a vehicle operator to the steering wheel, and the resulting output tire patch steering angle $\text{Theta}_{tp}$.

Such a block diagram is also useful in that it allows an assessment of the response to a perturbation arising anywhere between the system input (here, the applied steering wheel torque $T_s$) at input terminal 92 and the system output (here the steering angle or dirigible wheel tire patch angle $\text{Theta}_{tp}$) at output terminal 94. Therefore, while the block diagram 90 will be described in a forward direction from the input terminal 92 to the output terminal 94 (a direction associated with actually steering the vehicle), concomitant relationships in the other directions should be assumed to be present. However, detailed descriptions of such opposite, concomitant relationships are omitted herein for the sake of brevity.

In any case, an applied steering torque T present at terminal 96 and representative of actual torque applied to the torsion bar 70 is subtracted from $T_s$ at a summing point 98. That algebraic sum yields an "error torque" $T_e$, which in this case is the available torque for accelerating the moment of inertia of the steering wheel 12. $T_e$ is then divided by (or rather, multiplied by the reciprocal of) the sum of a foment of inertia and damping term $(J_s s^2 + B_s s)$ of the steering wheel 12 at block 100 where $J_s$ is the moment of inertia of the steering wheel, $B_s$ is steering shaft damping and s is the Laplace variable. The multiplication at the block 100 yields a steering wheel angle $Theta_s$ which serves as the positive input to another summing point 102. The negative input to the summing point 102 is a pinion feedback angle $Theta_p$ derived in part from the linear motion $X_r$ of the rack 66 at a terminal 104 described below. The summing point 102 yields an error angle $Theta_e$, which when multiplied by the stiffness $K_s$ (at block 106) of the combined steering shaft 60 and torsion bar 70 connecting the steering wheel 12 to the pinion 68 gives the applied steering torque T (at terminal 96) that is substantially present anywhere along the steering shaft 60 and at the pinion 68. $K_s$ can be considered as a series gain element in this regard. T is fed back from terminal 96 for subtraction $T_s$ at the summing point 98 in the manner described above. Division of T by the pitch radius $R_p$ of the pinion 68 at block 108 (or rather, multiplication by its reciprocal) gives the mechanical force $F_m$ applied to the rack 66 via the pinion 68.

The total steering force $F_t$ applied to the rack 66 is generated at summing point 110 and is the sum of the mechanical force $F_m$ applied to the rack 66 via the pinion 68 and a hydraulic force $F_h$ provided by the hydraulic assist of the particular system modeled by the block diagram 90. The hydraulic force $F_h$ is derived from the applied steering torque T (again, supplied from terminal 96) in a manner described in more detail below. In any case, the hydraulic force $F_h$ is summed with the mechanical force $F_m$ at summing point 110 to yield the total force $F_t$ in the manner indicated above.

Force applied to the effective steering linkage radius, $F_r$, is derived at terminal 112 and is subtracted from the total force $F_t$ at a summing point 114. The resulting algebraic sum $(F_t - F_r)$ from the summing point 114 is divided by (or rather, multiplied by the reciprocal of) a term $(M_r s^2 + B_r s)$ at block 116, where $M_r$ relates to the mass of the rack 66 and $B_r$ is a parallel damping coefficient term associated with motion of the rack 66. The resulting product is the longitudinal motion $X_r$ of the rack 66 at terminal 104. $X_r$ is supplied as the positive input to a summing point 18, from which the lateral motion $X_h$ of the steering gear housing 64 is subtracted. The algebraic sum $(X_r - X_h)$ taken at terminal 120 is divided by (or rather, multiplied by the reciprocal of) the pinion radius $R_p$ at block 122 to yield a rotational feedback angle $Theta_p$ which serves as the negative input to the summing point 102 as described above.

A time based derivative of the algebraic sum $(X_r - X_h)$ is taken at block 124 and then multiplied by power cylinder piston area A at block 126 to obtain a damping fluid flow $Q_d$ which is supplied as a negative input to summing point 128. Concomitantly, the applied steering torque T present at terminal 96 is detected by the torque transducer 28 (at block 130) to obtain an applied torque signal $V_{tt}$. The applied torque signal $V_{tt}$ is then multiplied by a control function constant $K_{cf}$ at block 132 to obtain a control function signal $V_{cf}$ that in turn is supplied as the positive input to summing point 134.

The one of the electronically controlled three-way control valves 24a and 24b whose output port 38 has the higher instant pressure value as detected by one of pressure transducers 30a or 30b is selected as the operative control valve 24a or 24b. The higher valued cylinder pressure P at terminal 136 is detected by the one of the pressure transducers 30a or 30b represented at block 138 to obtain feedback pressure signal $V_p$ which is then supplied as the negative input to summing point 134. The algebraic sum $(V_{cf} - V_p)$ is filtered (which operation may be accomplished via software control means) at block 140 and amplified at block 142 to obtain a control signal $V_c$. The control signal $V_c$ is then multiplied by a valve flow gain factor $K_q$ (e.g., of the selected electronically controlled three-way control valve 24a or 24b) at block 144 to obtain a control flow $Q_c$ that in turn is supplied as the positive input to summing point 128. The algebraic sum $(Q_c - Q_d)$ is next divided by (or rather, multiplied by the reciprocal of) an effective valve flow constant $K_c[1 + (V_t s)/(4 B_e K_c)]$ (e.g., indicative of the flow characteristics of the selected electronically controlled three-way control valve 24a or 24b) at block 146 to obtain the cylinder pressure P at terminal 136, where $K_c$ is the valve flow constant, $V_t$ is total cylinder volume and $B_e$ is fluid bulk modulus. Finally, the cylinder pressure P is multiplied by the power cylinder piston area A at block 148 to obtain the hydraulic force $F_h$.

The lateral motion $X_h$ of the steering gear housing 64 depends upon $F_r$. More particularly, $F_r$ is a negative input to a summing point 150, from which a force $F_{hsf}$ present at terminal 152 and applied to the sub-frame 72 as a housing-to-sub-frame force is subtracted. The lateral housing motion $X_h$ is then determined by the product of the algebraic sum $(-F_r - F_{hsf})$ and a control element $1/(M_h s^2)$ at block 154, where $M_h$ is the mass of the steering gear housing 64. $X_h$ is taken from terminal 156 as the negative input to summing point 118 to yield the algebraic sum $(X_r - X_h)$ in the manner described above.

The output tire patch steering angle $Theta_{tp}$ at output terminal 94 is determined by tire patch torque $T_{tp}$ applied to the tire patches 158 (shown in FIG. 1) at terminal 160 multiplied by a control element $1/(B V_{tp} s + K_{tp})$ shown at block 162, where $K_{tp}$ and $B_{tp}$ are tire patch torsional stiffness and damping coefficient terms, respectively. The tire patch torque $T_{tp}$ at terminal 160 is determined by the difference, achieved via summing point 164, between the average dirigible wheel angle $Theta_w$ and the average output tire patch angle $Theta_{tp}$ multiplied by a control element $(B_{sw} s + K_{sw})$ shown at block 166, where $K_{sw}$ and $B_{sw}$ are torsional stiffness and torsional damping coefficients, respectively, associated with torsional deflection of tire side walls 168 (again shown in FIG. 1) with respect to the dirigible wheels 58. $Theta_w$ is determined by the difference (achieved via summing point 170) between the torque $T_w$ applied to the dirigible wheels 58 and the tire patch torques $T_{tp}$, multiplied by a control element $1/(J_w s^2)$ shown at block 172, where $J_w$ is moment of inertia of the dirigible wheels 58.

The torque $T_w$ applied to the dirigible wheels 58 is determined by the force $F_r$ applied at the effective steering linkage radius (located at terminal 112) multiplied by a control element $R_w$ shown at block 174, where $R_w$ is the effective steering linkage radius of the portion 84 of the steering knuckles 78 defined above. The force $F_r$ is determined in three steps. First, (f $X_{sf}$) is subtracted from $X_r$ at summing point 176 with (f $X_{sf}$) having been obtained by multiplying (at block 178) the lateral motion $X_{sf}$ of the sub-frame 72 present at terminal 180 by a coupling factor f between the sub-frame 72 and mounting points 182 (shown in FIG. 1) for the lower control arms 82 and thus the dirigible wheels 58. Second, the product of $\text{Theta}_w$ and $R_w$ (obtained by multiplication at block 184) is subtracted from the algebraic sum $(X_r-\text{f }X_{sf})$ at summing point 186. Finally, this difference $(X_r-\text{f }X_{sf}-\text{Theta}_w R_w)$ is multiplied by a control element $K_r$ shown at block 188 to yield the rack forces $F_r$ at terminal 112, where $K_r$ is the stiffness of the connecting elements between the rack 66 and the dirigible wheels 58 (e.g., principally the stiffness of the portion 84 of the steering knuckles 78). $F_r$ is then returned to summing point 114 and the subsequent derivation of $X_r$ at terminal 104 is determined in the manner described above.

The balance of the block diagram 90 models the structural elements disposed in the path of reaction forces applied to the steering gear housing 64, and provides the lateral motion $X_{sf}$ of the sub-frame 72 (at terminal 180) and the housing-to-sub-frame force $F_{hsf}$ (at terminal 152) mentioned above. Ultimately, the reaction force is applied to the mounting points 182 (at terminal 190) of the dirigible wheels 58 as a sub-frame reaction force $F_{sf}$. More particularly, $F_{sf}$ is determined by the product of a control element $(B_{sfmp}S+K_{sfmp})$ shown at block 192 and $X_{sf}$ at terminal 180, where $K_{sfmp}$ and $B_{sfmp}$ are stiffness and series damping coefficient terms, respectively, associated with the interface between the sub-frame 72 and the mounting points 182. $X_{sf}$ at terminal 180 is determined by the product of control element $1/(M_{sf}S^2+B_{sf}s)$ shown at block 194, where $M_{sf}$ is the mass of the sub-frame as well as coupled portions of the host vehicle's structure and $B_{sf}$ is damping associated with coupling the sub-frame 72 to the structure, and an algebraic sum $(F_{hsf}-F_{sf})$ generated by summing point 196, where $F_{hsf}$ is the force applied to the sub-frame 72 as the housing-to-sub-frame force located at terminal 152. $F_{hsf}$ is determined by the product of a control element $(B_{hsf}S+K_{hsf})$ shown at block 198, where $K_{hsf}$ and $B_{hsf}$ are stiffness and damping terms associated with the interface between the steering gear housing 64 and the sub-frame 72, and an algebraic sum $(X_h-X_{sf})$ generated by summing point 200. The positive input to summing point 200, $X_h$, is taken from terminal 156 while the negative input, $X_{sf}$, is taken from terminal 180.

The following values and units for the various constants and variables mentioned above can be considered exemplary for a typical power steering system, and a conventional host vehicle on which it is employed:

$1/(Btp\ s+K_{tp})=1/(20s+8,000)$[rad./in.-lb.]

$B_{sw}s+K_{sw}=30s+500,000$[in.-lb./rad.]

$1/(J_w s^2)=1/(8s^2)$[rad./in.-lb.]

$1/(B_s s+J_s s^2)=1/(0.1s+0.5s^2)$[rad./in._31 lb.]

$R_w=5$[in/rad.]

$K_k=8,000$[lb./in.]

$1/(M_r s^2+B_r s)=1/(0.02s^2+0.1s)$[in./lb.]

$1/R_p=1/0.315$[in.$^1$]

$K=500$[in.-lb.]

$f=0.7$ (dimensionless)

$A=1.5$[in.$^2$]

$1/(M_h s^2)=1/(0.05s^2)$[in./lb.]

$B_{hsf}s+K_{hsf}=100s+150,000$[lb/in.]

$1/(B_{sf}s+M_{sf}s^2)=1/(0.05s+0.4s^2)$[in./lb.]

$B_{sfmp}s+K_{sfmp}=10s+20,000$[lb./in.]

$V_t=12$[in.$^3$]

$B_e=100,000$[lb./in.$^2$]

$K_c=0.1$[in.$^5$/lb.-sec.]

$P_i, P_c, P_d,=$[lb./in.$^2$]

$X_r, X_h, X_{sf}, X_f=$[in.]

$F_{hsf}, F_h, F_{sf}, F_t, F_m, F_h, F_r=$[lb.]

$T, T_s, T_{tp}=$[in.-lb.]

$\theta_s, \theta_e, \theta_p, \theta_w, \theta_{tp}=$[rad.]

It should be noted that the block diagram 90 is a minimal block diagram presented herein for enabling a basic understanding of dynamics of the steering system 10. In particular, a more complete representation would include various electronic resistance, electronic inductance, mass and stiffness elements associated with internal operation of the electronically controlled three-way control valve 24a or 24b. It is believed herein however, that these factors can be controlled in an inner feedback control loop separate from the overall feedback loop implemented with reference to the torque transducer. Preferably the inner feedback control loop would be implemented with reference to pressure signals representative of actual fluid pressure values present at the first and second cylinder ports 14a and 14b as provided by the first and second pressure transducers 30a and 30b (e.g., with at least one of them at reservoir pressure). This type of control technique, including a near real-time method of pressure transducer calibration, is described in detail in the incorporated '254 patent. In addition, pertinent control valve design and control technologies are fully described in a book entitled "Hydraulic Control Systems" by Herbert E. Merritt and published by John Wiley & Sons, Inc. of New York.

In passing however, it should be noted that functioning of the electronically controlled three-way control valves 24a and 24b differs fundamentally from that of a common open-center control valve because the electronically controlled three-way control valves 24a and 24b are fundamentally flow control devices whereas open-center control valves are pressure control devices. In fact, their version of a gain constant $K_q'$ is actually a pressure gain constant with dramatically differing values that relate valve output pressures to input error angles. In any case, procedures for determining appropriate values for $K_q$ and $K_c$ as utilized herein are fully described in the book entitled "Hydraulic Control Systems". On the other hand, procedures for determining appropriate values for $K_{cf}$ over a range of input steering wheel torque and vehicle speed values are fully described in the incorporated '254 patent. Also, a description of procedures for evaluating stability criteria for power steering systems such as the power steering system 10 as depicted in the block diagram 90 can be found in the incorporated '254 patent and will not be repeated herein.

Finally, although the block diagram 90 includes a single electronically controlled closed-center three-way control valve 24a or 24b, this is exemplary only as it is clear that each is alternately utilized depending upon which pressure transducer 30a or 30b provides the higher pressure signal. This requires electronic (e.g., hardware, software or software actuated firmware) switching means (not shown) whereby the appropriate three-way control valve 24a or 24b is selected in accordance with the pressure transducer 30a or 30b providing the higher pressure signal to the controller 26.

Of course, if the two-position three-way valve 32 is not utilized, then the three-way control valves 24a and 24b can be replaced by a single electronically controlled closed-center four-way control valve (not shown). The penalty for doing so is of course that the average system pressure value would then be more-or-less equal to one-half of the accumulator pressure and would stress various cylinder seals (not shown) in an undesirable manner. Nonetheless, such a system is possible and is considered herein to fall within the scope of the present invention.

Figure 3:
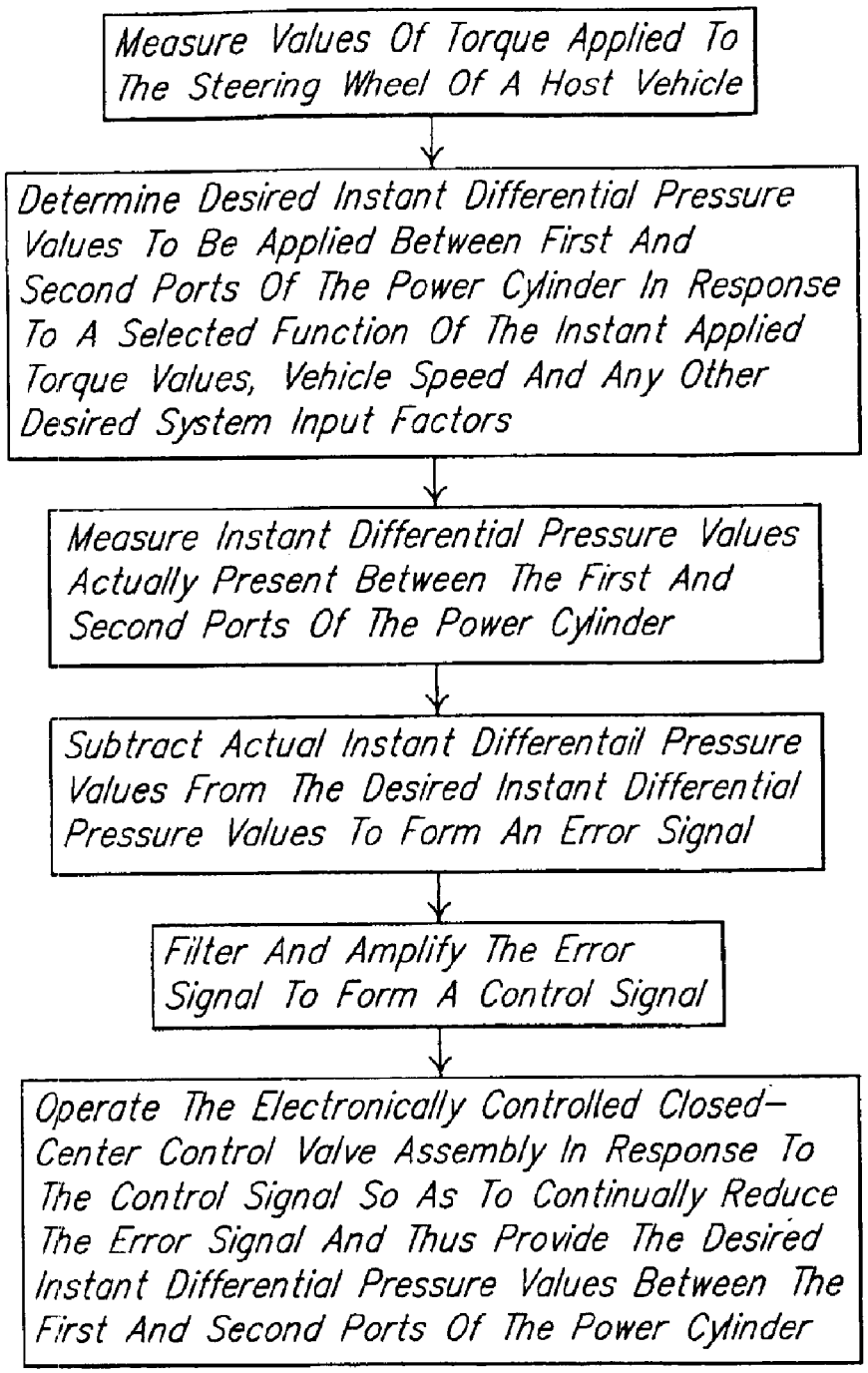
FIG. 3 is a flow chart depicting a general method of control for the power steering system of the present invention.

As depicted in the flow chart of FIG. 3, a general method for enabling a power steering system utilizing an accumulator, a reservoir, and an electronically controlled closed-center control valve assembly for selectively fluidly coupling the accumulator and reservoir to a double-acting power cylinder of a power steering system, to function in the manner of a force-based power steering system comprises the steps of: measuring values of torque applied to the steering wheel of a host vehicle; determining desired instant differential pressure values to be applied between first and second ports of the power cylinder in response to a selected function of the instant applied torque values, vehicle speed and any other desired system input factors; measuring instant differential pressure values actually present between the first and second ports of the power cylinder; subtracting actual instant differential pressure values from the desired instant differential pressure values to form an error signal; filtering and amplifying the error signal to form a control signal; and operating the electronically controlled closed-center control valve assembly in response to the control signal so as to continually reduce the error signal and thus provide the desired instant differential pressure values between the first and second ports of the power cylinder.

Figure 4:
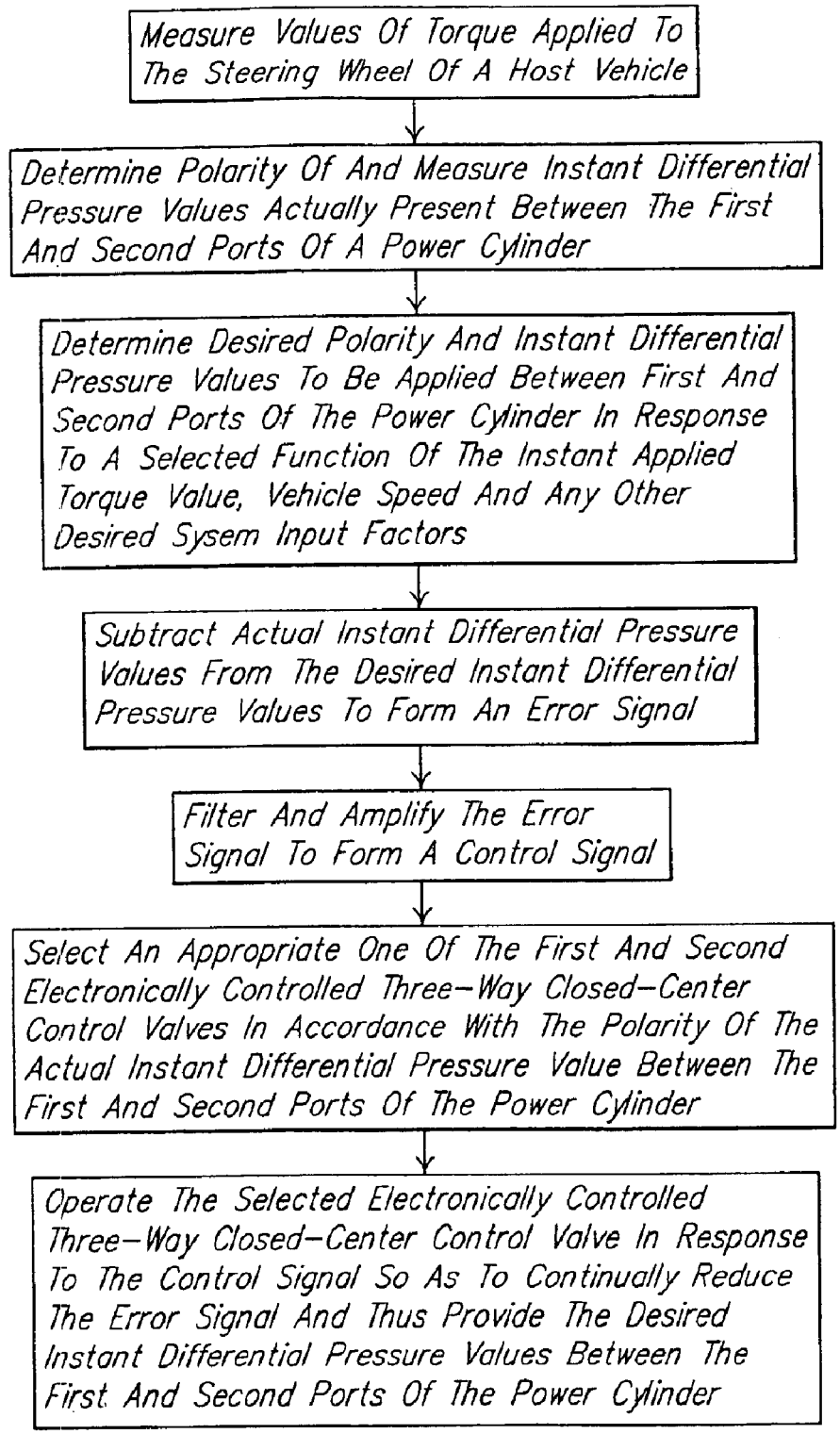
FIG. 4 is a flow chart depicting a more detailed method of control for the power steering system of the present invention.

And as depicted in the flow chart of FIG. 4 wherein the electronically controlled closed-center control valve assembly comprises a two-position three-way valve for fluidly coupling the cylinder port having the lowest pressure value to the reservoir and the preferred pair of first and second electronically controlled three-way control valves, the method comprises the steps of: measuring values of torque applied to the steering wheel of the host vehicle; determining polarity of and measuring instant differential pressure values actually present between the first and second ports of the power cylinder; determining desired polarity and instant differential pressure values to be applied between first and second ports of the power cylinder in response to a selected function of the instant applied torque value, vehicle speed and any other desired system input factors; subtracting actual instant differential pressure values from the desired instant differential pressure values to form an error signal; filtering and amplifying the error signal to form a control signal; selecting an appropriate one of the first and second electronically controlled three-way closed-center control valves in accordance with the polarity of the actual instant differential pressure value between the first and second ports of the power cylinder; and operating the selected electronically controlled three-way closed-center control valve in response to the control signal so as to continually reduce the error signal and thus provide the desired instant differential pressure values between the first and second ports of the power cylinder.

Having described the invention, however, many modifications thereto will become immediately apparent to those skilled in the art to which it pertains, without deviation from the spirit of the invention. For instance, the motor 50 and pump 52 could be replaced by a belt driven pump comprised within a belt driven engine accessory assembly. A simple electronically controlled two-way valve could then be used to close a bypass passage and force pumped fluid through the check valve 54. Such modifications clearly fall within the scope of the invention.

INDUSTRIAL APPLICABILITY

The instant system is capable of providing electrically powered steering systems intended for large vehicles, and accordingly finds industrial application in power steering systems intended for large vehicles and other devices requiring large values of powered assist in response to torque applied to a steering wheel, or indeed, any control element functionally similar in nature to a steering wheel.

What is claimed is:

1. A power steering system for a vehicle having dirigible wheels, comprising:

a steering wheel;

a power steering gear comprising a double-acting power cylinder having first and second cylinder ports;

an accumulator;

a reservoir;

an electronically controlled closed-center control valve assembly having an input pressure port fluidly connected to the accumulator, a return port fluidly connected to a reservoir, and first and second output ports respectively fluidly connected to first and second ports of the double-acting power cylinder, the electronically controlled closed-center control valve assembly comprises first and second electronically controlled three-way control valves, each having an input pressure port fluidly connected to the accumulator, a return port fluidly connected to the reservoir and an output port fluidly connected to a respective power cylinder port;

a steering wheel torque transducer for providing a steering wheel torque signal indicative of torque applied to the steering wheel;

a controller, wherein the controller provides a control signal to the electronically controlled closed-center control valve assembly for operating the control valve assembly in response to at least the steering wheel torque signal so as to substantially provide the desired instant differential pressure value between the first and second ports of the power cylinder, wherein the controller selects the one of the electronically controlled three-way control valves fluidly connected to the one of the first and second pressure transducers issuing the higher valued pressure signal, and operates the selected electronically controlled three-way control valve in response to at least the magnitude of the steering wheel torque signal so as to substantially provide the desired instant differential pressure value between the first and second ports of the power cylinder; and first and second pressure transducers fluidly counted to the first and second ports of the double-acting power cylinder, respectively, wherein the first and second pressure transducers respectively issue pressure signals indicative of fluid pressure values instantly present at the first and second ports of the double-acting power cylinder to the controller.

2. A method for enabling a power steering system utilizing an accumulator, a reservoir, and an electronically controlled closed-center control valve assembly for selectively fluidly coupling the accumulator and reservoir to a double-acting power cylinder of a power steering system, to function in the manner of a force-based power steering system, wherein the method comprises the steps of:

measuring values of torque applied to the steering wheel of a host vehicle;

determining desired instant differential pressure values to be applied between first and second ports of the power cylinder in response to a selected function of the instant applied torque values, vehicle speed and any other desired system input factors;

measuring instant differential pressure values actually present between the first and second ports of the power cylinder;

subtracting actual instant differential pressure values from the desired instant differential pressure values to form an error signal;

amplifying the error signal to form a control signal; and operating the electronically controlled closed-center control valve assembly in response to the control signal so as to continually reduce the error signal and thus provide the desired instant differential pressure values between the first and second ports of the power cylinder.

3. A method for enabling a power steering system utilizing an accumulator, a reservoir, a two-position three-way valve for fluidly coupling the cylinder port having the lowest pressure value to the reservoir, and first and second electronically controlled three-way closed-center control valves, to function in the manner of a force-based power steering system, wherein the method comprises the steps of:

measuring values of torque applied to the steering wheel of a host vehicle;

determining polarity of and measuring instant differential pressure values actually present between the first and second ports of the power cylinder;

determining desired polarity and instant differential pressure values to be applied between first and second ports of the power cylinder in response to a selected function of the instant applied torque value, vehicle speed and any other desired system input factors;

subtracting actual instant differential pressure values from the desired instant differential pressure values to form an error signal;

amplifying the error signal to form a control signal;

selecting an appropriate one of the first and second electronically controlled three-way closed-center control valves in accordance with the polarity of the actual instant differential pressure value between the first and second ports of the power cylinder; and operating the selected electronically controlled three-way closed-center control valve in response to the control signal so as to continually reduce the error signal and thus provide the desired instant differential pressure values between the first and second ports of the power cylinder.

* * * * *

UNITED STATES PATENT AND TRADEMARK OFFICE
CERTIFICATE OF CORRECTION

PATENT NO.        : 6,945,352 B2
APPLICATION NO.   : 10/858093
DATED             : September 20, 2005
INVENTOR(S)       : Edward H. Phillips It is certified that error appears in the above-identified patent and that said Letters Patent is hereby corrected as shown below:

Column 11 - 12 -

Replace "$1/(Jw\ s5) = 1/(8\ s2)\ [rad./in.-lb.]$" with --$1/(Jw\ s2) = 1/(8\ s2)\ [rad./in.-lb.]$--.

Replace "$1/(Bs\ s + Js\ s2) = 1/(0.1\ s + 0.5\ s2)\ [rad./in.-lb.]$" with --$1/(Bs\ s + Js\ s2) = 1/(0.1\ s + .5\ s2)\ [rad./in.-lb.]$--.

Replace "$1/Rp = 1/0.315\ [in.1]$" with --$1/Rp = 1/0.315\ [in.-1]$--.

Replace "$Pi, Pc, Pd, = [lb./in.2]$" with --$Pl, Pc, Pd, = [lb./in.2]$--.

Signed and Sealed this

Twenty-second Day of August, 2006

JON W. DUDAS
*Director of the United States Patent and Trademark Office*